(12) United States Patent
Govind et al.

(10) Patent No.: US 12,443,631 B1
(45) Date of Patent: Oct. 14, 2025

(54) MACHINE LEARNING MODEL-BASED RESOLUTION OF LOCATION INFORMATION

(71) Applicant: Amazon Technologies, Inc., Seattle, WA (US)

(72) Inventors: Govind, Bengaluru (IN); Sayan Putatunda, Bangalore (IN); Saurabh Diwakar Sohoney, Ujjain (IN); Amber Roy Chowdhury, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/886,672

(22) Filed: Sep. 16, 2024

(51) Int. Cl.
*G06F 16/00* (2019.01)
*G06F 16/23* (2019.01)
*G06F 16/29* (2019.01)

(52) U.S. Cl.
CPC .......... *G06F 16/29* (2019.01); *G06F 16/2365* (2019.01)

(58) Field of Classification Search
CPC ............................. G06F 16/29; G06F 16/2365
See application file for complete search history.

(56) References Cited

U.S. PATENT DOCUMENTS

| | | | |
|---|---|---|---|
| 7,324,666 B2 * | 1/2008 | Zoken | G01C 21/3867 382/113 |
| 7,831,486 B2 * | 11/2010 | Main, II | G06Q 20/203 705/28 |
| 8,538,679 B1 * | 9/2013 | Takyar | G01C 21/36 455/457 |
| 8,626,789 B2 * | 1/2014 | Jayanti | G06F 16/29 707/723 |
| 8,650,024 B1 * | 2/2014 | Snellman | G06F 16/29 707/723 |
| 9,020,941 B1 * | 4/2015 | Gupta | G06F 16/29 707/921 |
| 11,157,930 B1 * | 10/2021 | Bachu | G06Q 30/0201 |
| 11,250,452 B2 * | 2/2022 | Kulkarni | G06Q 30/0205 |
| 11,380,441 B1 * | 7/2022 | Baker | G06F 16/29 |
| 11,575,648 B2 * | 2/2023 | Jones | H04L 9/0822 |
| 11,762,914 B2 * | 9/2023 | Hoffman | G06F 16/29 707/724 |
| 12,299,581 B1 * | 5/2025 | Wilson | G06N 3/088 |
| 2009/0150393 A1 * | 6/2009 | Bourland, II | G06F 16/29 |
| 2009/0177643 A1 * | 7/2009 | Gupta | G06F 40/20 707/999.005 |
| 2010/0020942 A1 * | 1/2010 | Olshansky | H04W 76/50 379/45 |
| 2010/0106801 A1 * | 4/2010 | Bliss | G06T 11/60 709/219 |
| 2011/0161334 A1 * | 6/2011 | Sivakkolundhu | G06F 16/29 707/E17.014 |

(Continued)

*Primary Examiner* — Noosha Arjomandi
(74) *Attorney, Agent, or Firm* — Kilpatrick Townsend & Stockton LLP

(57) ABSTRACT

Techniques for improving last mile transportation and planning execution are described. In an example, a description of an address is received. Whether the address is not associated with a known geocode is determined. Using an ML model, an embedding vector of the address in an embedding space is generated, the ML model trained to embed addresses and geocodes in the embedding space. Based on the embedding vector, one or more known geocodes is determined. The address is then associated with the one or more known geocodes.

20 Claims, 10 Drawing Sheets

(56) References Cited

U.S. PATENT DOCUMENTS

| | | | |
|---|---|---|---|
| 2011/0197200 A1* | 8/2011 | Huang | G06F 16/29 |
| | | | 719/328 |
| 2014/0280318 A1* | 9/2014 | Simms | G06F 16/29 |
| | | | 707/769 |
| 2020/0004843 A1* | 1/2020 | Valegerepura | G01C 21/20 |
| 2022/0065654 A1* | 3/2022 | Shankar | G06N 3/08 |
| 2022/0270044 A1* | 8/2022 | Bolton | G06Q 10/0837 |

* cited by examiner

MACHINE LEARNING MODEL-BASED RESOLUTION OF LOCATION INFORMATION

BACKGROUND

Geocodes generally represent location information that can be used by different services and devices. For example, an unmanned vehicle can be directed or controlled to move along the path by using geocodes. In another example, user guidance can be provided via a user device that presents a map or navigational instructions based on the geocodes.

BRIEF DESCRIPTION OF THE DRAWINGS

Various embodiments in accordance with the present disclosure will be described with reference to the drawings, in which.

DETAILED DESCRIPTION

Figure 1:
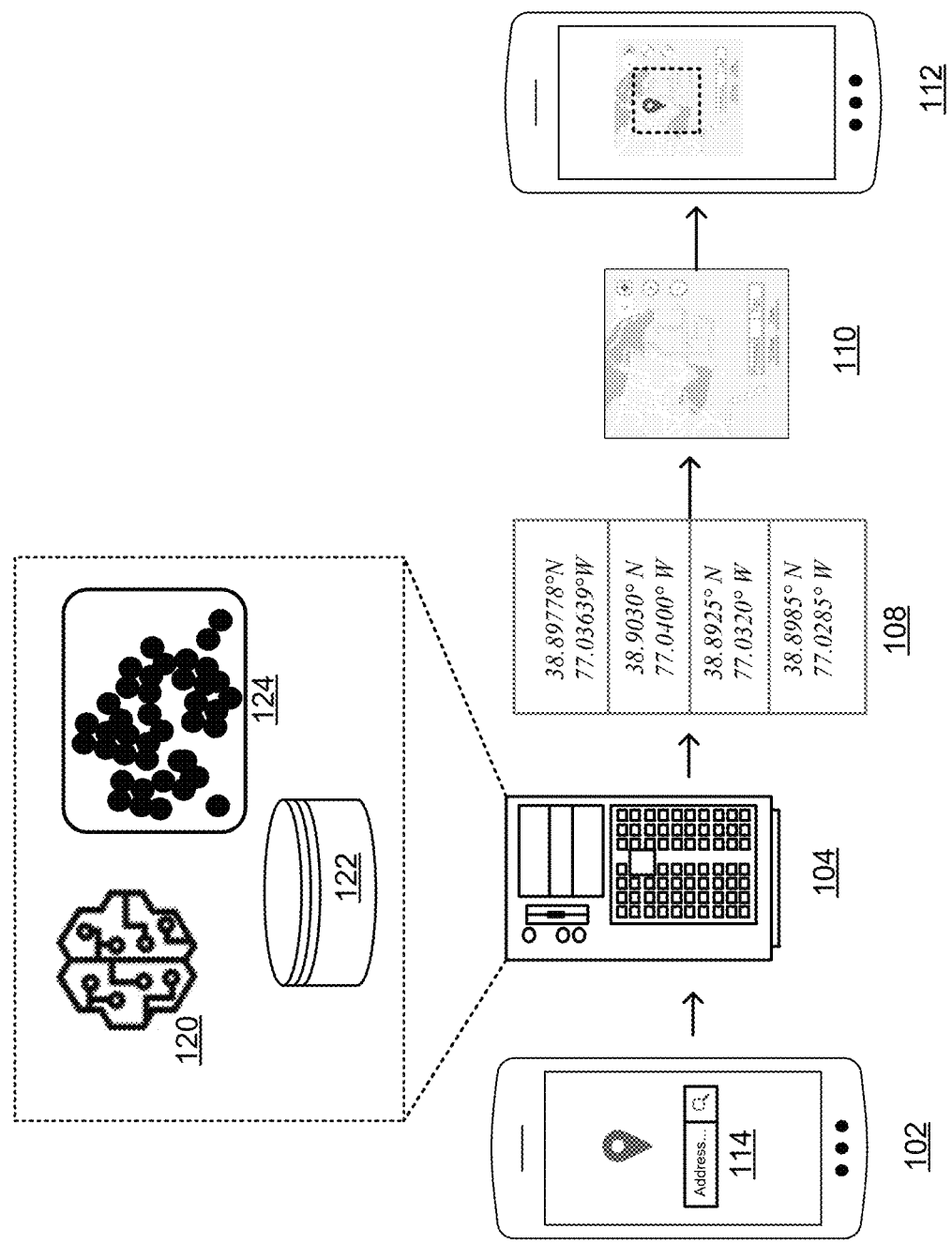
FIG. 1 illustrates an example system for determining a geocode for an unknown address, according to some embodiments.

In the following description, various embodiments will be described. For purposes of explanation, specific configurations and details are set forth to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, artificial intelligence model-based resolution of geocodes. In an example, a computer system can execute program code for a machine learning (ML) model (which is an example of an artificial intelligence model) trained to embed addresses and geocodes in the same embedding space. Upon receiving information describing an address that is unknown, the ML model can generate an embedding vector corresponding to this unknown address. The embedding vector can then be used to determine a set of geocodes (e.g., ones associated with embedding vectors that have a sufficient similarity to the unknown address's embedding vector). The set of geocodes can be used to approximate the geocode of the unknown address.

To illustrate, consider the use case of a last mile delivery service. In this case, an item needs to be delivered to an address. Information identifying the address may be input at a user interface. However, this address may not have already been associated with a known geocode. Different causes can exist for such a situation. For instance, the information can incorrectly identify the address (e.g., by including errors) and/or possibly no delivery has been performed to that address before. Additionally, the information may correctly identify an address, whether a successful previous delivery has or has not occurred to the address, but for which there is no accessible association with a known geocode. This lack of accessible association with a known geocode may be the result of, for example, an error on the backend system. In any such situation, the aforementioned ML model can be invoked, whereby the information can be input to this ML model. The ML model outputs an embedding vector. Next, the embedding vector is used in a query to a database that stores information about known geocodes (e.g., ones to which previous deliveries have been successfully completed) and/or known addresses corresponding to these geocodes, in addition to embedding vectors corresponding to the known geocodes and/or known addresses (where these vectors may have been previously generated by the ML model). A database engine can match the queried embedding vector with a set of embedding vectors having a particular set size (e.g., ten embedding vectors). The match can be based on one or more similarity measurements between the queried embedding vector and the database-stored embedding vectors, such as cosine similarity, Euclidean distance similarity, a clustering algorithm, and the like. The database engine can determine a set of known geocodes stored in the database and corresponding to the matched set of embedding vectors. The query result can include this set of known geocodes. Map data can be generated and identify an area bounded by the known geocodes. A user device can present the map data to indicate that the delivery of the item is to occur within the area.

In the interest of clarity of explanation, various embodiments of the present disclosure are described in connection with last mile transportation planning and execution that may involve a user device presenting a map. However, the embodiments are note limited as such. Particularly, the embodiments similarly and equivalently apply to resolving an unknown address to a set of known geocodes (or corresponding known addresses) for any type of services. For instance, a similar scenario as the above illustrative example can be implemented for guiding an unmanned vehicle, such as an unmanned ground or aerial vehicle. Here, rather than presenting a map on the user device, the unmanned vehicle (e.g., its processor(s)) can receive the set of the known geocodes and control its operations (e.g., its navigation) based on these known geocodes. For instance, the unmanned vehicle can determine the area bounded by the geocodes and control its navigation to move to a particular point within the area (e.g., to the center of the area, or a public location within the area). Likewise, the unknown address resolution need not relate to a delivery service. For instance, a land use surveying service can invoke the ML model to determine areas with known and unknown addresses such that related geocodes are determined and used for planning purposes.

Furthermore, embodiments are described with resolving an unknown address to a set of known geocodes. The embodiments similarly and equivalently apply to resolving an unknown geocode to a set of known addresses (whether the input to the ML model can be the unknown geocode and its embedding vector output can be used to determine the set of known addresses). The embodiments also similarly and equivalently apply to resolving an unknown address to a set of known addresses (whether the input to the ML model can be the unknown address and its embedding vector output can be used to determine the set of known addresses). Further, the embodiments similarly and equivalently apply to resolving an unknown geocode to a set of known geocodes (whether the input to the ML model can be the unknown geocode and its embedding vector output can be used to determine the set of known geocodes). According to some embodiments, a portion of the addresses, geocodes, or embeddings vectors may be used to identify an area or a grouping such as a zip code or zone of a city.

Generally, resolving addresses to geocodes in the real world can effectively facilitate last mile transportation planning and execution. Embeddings of geospatial data (e.g., addresses, geocodes) play a role in the success of modelling downstream tasks such as geocoding, geofencing, address matching, and so on. An input for these modeling tasks is delivery locations which can be learnt by aggregating historical delivery scans for warm-start address (e.g., with prior successful deliveries), or matching the address text to a known reference set for cold-start addresses (e.g., no prior deliveries). The process of determining the geographic coordinates (latitude and longitude) of addresses is commonly known as geocoding, and it can be particularly challenging for cold-start cases in both matured and emerging regions due to few or no deliveries in the past. Thus, a comprehensive understanding of the address text becomes relevant to match to a known reference set and perform accurate geocoding.

In an example, a last mile transportation and planning system receives data information corresponding to a natural language input that describes an address. Assume that the system determines that a corresponding geocode is not stored in a database of the system. The system may be configured to use an ML model to generate an embedding vector of the address, where the ML model has been trained to embed addresses and geocodes in a same embedding space. The system may also be configured to determine a set of known geocodes from the embedding vectors that are similar to the embedding vector of the address. The system may also be configured to generate map data of an area encompassing the set of known geocodes and instruct a user device to present the map data as a map on a user interface.

To illustrate the last mile transportation and planning use case, consider an example of user device presenting instructions to a delivery driver about delivering an item to an address where there have been no previous deliveries or where a previous delivery failed. This address can be referred to herein as an unknown address. Using the ML model, the system provides direction guidance as a set of instructions to the user device that in turn presents a map via a user interface to the delivery driver. In this example, for other users within a surrounding area, items may have been successfully delivered. After each previous successful delivery, global positioning system (GPS) data may have been collected, where such data represents known geocodes. Based on the previous delivery data, the ML model may generate embedding vectors that correspond to the nearby addresses and/or known geocodes. The system may input the unknown address to the ML model that then generates an embedding vector. The system may match the embedding vector with the embedding vectors of the nearby addresses and/or known geocodes. The system may generate map data that encompasses these addresses and determine a geographic area within which the item should be delivered. This map data can be sent to the user device and presented thereat as a map to guide the delivery driver as close as possible to the exact delivery location.

Embodiments of the present disclosure provide various technological advantages over systems. Generally, embodiments of the present disclosure enable more accurate location estimation (e.g., by resolving an unknown address and/or unknown geocode to a set of known addresses and/or known geocodes). This capability can be enabled due to the use of the same embedding space for addresses and geocodes. By improving the accuracy of location estimation, downstream computing services that rely on the location estimation can be improved. For instance, the location estimation can be used as an input to a downstream computing service. because the input of the downstream computing service is improved, the output thereof can also be improved without the need to modify the program code of the downstream computing service.

To illustrate such advantages, consider the last mile transportation and planning use case. Conventional systems may attempt to mimic real-world proximity via a triplet loss which is error prone and fails for a significant volume of addresses due to lack of third-party reference set coverage, matching recall, insufficient deliveries to the area in past or vernacular nature of addresses. In comparison, the embodiments provide embedded addresses and geocodes or geolocations (e.g., latitude and longitude coordinates) data in the same embedding space to enable late fusion of cross-modal semantics and remove dependency on triplet creation. The embodiments improve geocode precision and reduce defects across geographies with diverse writing standards and can jointly align more geospatial modalities. Additionally, while prior methods focus on producing building-level geocodes, the embodiments can learn neighborhood-level boundaries and geocodes to handle significant volumes of cold-start addresses that cannot be geocoded at the building level. This enables more accurate and reliable last-mile delivery planning, even in the absence of historical delivery data. To overcome the issue of low confidence in a target location, the embodiments described herein provide a solution for cold-start deliveries by directly learning a dynamic neighborhood boundary and predicting neighborhood polygons that can be used to inject soft-block interventions to delivery partners.

Additional advantages of the embodiments of the present disclosure includes the ability handle the unique challenges of cold start geocoding, for example, when building level geocoding is not feasible. Jointly embedding address text and geocode modalities in the same high-dimensional space, can allow for rich cross-modal learning and transfer of proximity semantics. Thus, a model may automatically learn associations between address characteristics and their corresponding geocodes. These techniques provide a significant advancement in cold start geocoding across geographies to enable effective last mile delivery planning and execution.

As discussed above, geocoding may be particularly challenging for cold start cases. This may be due to many factors. For example, address text in matured geographies, such as the U.S., is largely driven by street numbers and street names which can be non-trivial to understand by ML models because of the presence of ambiguous numbers and location instructions such as: 8 3 Lakes Rd, -8 Three lakes rd Beige Brick Ranch left side of street, 60010-4032, Barrington, IL, US. On the other hand, other geographies lack standardization in address formatting, and may include spelling variations, missing components, use of local language, synonyms and abbreviations. For example, Sonai nadi ka pul, Sonai Baidpura Etawah, 206002, Etawah, UP, IN, includes Romanized Hindi and fails to contain fine-grained details beyond the locality and landmark mentions. Apart from the unstructured nature, emerging regions may also have relatively large portions of cold start addresses.

By continuously embedding address and geocode modalities in the same high dimensional space, address representations can be associated with geocodes based on various grounding tokens present in addresses. Similarly, geocode representations can be associated with a given geocode with characteristics of local addresses in a close vicinity.

FIG. 1 illustrates an example system for determining a geocode for an unknown address, according to some embodiments. As shown in FIG. 1, a user device 102 may receive user input about a delivery address 114. User device 102 may be operated by a user to obtain an item such that the item is delivered to delivery address 114. The user input may be in the form of a natural language input (e.g., free form or unstructured text) that describes delivery address 114.

As shown in FIG. 1, delivery address 114 (or, more specifically, the user input or data describing delivery address 114) may be received by server 104. Server 104 may store program code for an ML model 120, data defining an embedding space 124 of the ML model 120, and a database 122. Database 122 may contain historical delivery data such as known address-geolocation pairs and possibly embedding vectors from the embedding space 124. Server 104 may first query database 122 to determine if delivery address 114 is in database 122. If so, delivery address 114 is known and the query result can include the corresponding geocode that may be used to provide precise directions to delivery address 114 to a delivery personnel (e.g., via a user interface of a user device 112). Otherwise, delivery address 114 is unknown and at least the ML model 120 can be used to resolve delivery address 114 to a set of known geocodes.

In particular, in the situation of an unknown address, the user input may be unstructured text that has an error and/or may not correspond to prior deliveries (e.g., a cold start address). In this case, delivery address 114 is not mapped in database 122 to a known geocode. As such, delivery address 114 (or, more specifically, the user input or data describing delivery address 114 or at least a portion of delivery address 114) may be input into ML model 120 which can generate an embedding vector of the address. According to some embodiments, ML model 120 has been trained to embed addresses and geocodes in the same embedding space 124, as will be described in greater detail below. The embedding vector may be input into embedding space 124 to determine nearby embedding vectors (or, alternatively may be used to query database 122 in case of this database 122 also store embedding vectors of known addresses and/or known geocodes). The nearby embedding vectors may correspond to known geocodes and/or known addresses and may be determined based on a similarity function. The similarity function can be a cosine similarity, an Euclidean distance similarity, and/or a clustering algorithm. The nearby embedding vectors may be input into database 122 to determine corresponding geocodes for each of the nearby embedding vectors, and outputting a set of known geocodes 108.

Using the set of known geocodes 108, server 104 may generate map data 110 that indicates an area encompassing the set of known geocodes 108 (e.g., the area is bounded by geocodes 108). Additionally, server 104 may send map data 110 to user device 112 (e.g., of a delivery driver) such that the user device 112 can present it as map on a user interface, where the presentation indicates that the area in which the unknown address (e.g., delivery address 114) is located.

According to some embodiments, delivery address 114 may be resolved to an area within a city such as a neighborhood, a zip code, a street, etc. All of or a portion of delivery address 114 may be input into ML model 120 which can generate an embedding vector of all of or a portion of the input delivery address 114. In this way, the area, may have a corresponding embedding vector that may be matched to delivery address 114. According to some embodiments, the matched embedding vectors are mapped to the area. For example, the nearby embedding vectors may be input into database 122 to determine corresponding an area or portions of nearby embedding vectors. In another example, a first portion of the embedding vector (e.g., last 8 bits) are matched with a second portion of an embedding vector of a known address (e.g., last 8 bits). The portion may correspond to, for example, a known city. Therefore, delivery address 114 may be associated with the known city. In other words, ML model 120 may generate an embedding vector of delivery address 114 for which a shorter prefix may be extracted (possibly in a lower-fidelity representation).

Figure 2:
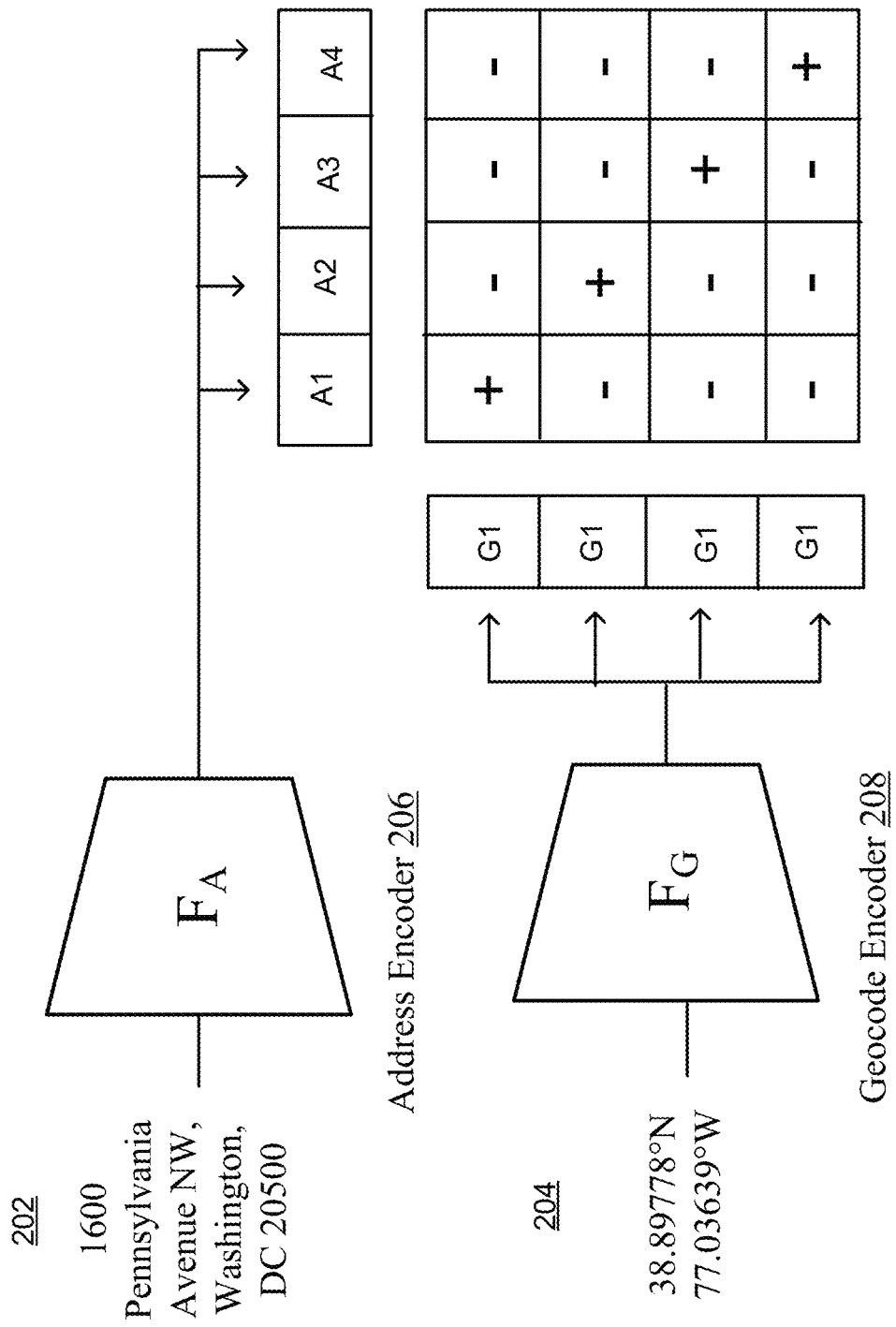
FIG. 2 illustrates an example of training a machine learning (ML) model for embedding addresses and geocodes in an embedding space, according to some embodiments.

FIG. 2 illustrates an example training of an ML model for embedding addresses and geocodes in an embedding space, according to some embodiments. The ML model is an example of an artificial intelligence model and includes an address encoder 206 for encoding addresses into an embedding space. The ML model can also include a geocode encoder 208 for encoding geocodes in the same embedding space. The training can be applied to both address encoder 206 and 208 in parallel or sequentially or to only one of such encoders (assuming that the other encoders is already trained).

According to some embodiments, the ML model may be a multi-modal ML model. The ML model may, for example, store additional, contextual data that may be embedded in the embedding space and used in the output of the ML model. To illustrate, the contextual data may include satellite imagery or known map data such as area elevations, roads, etc.

Generally, a training location pair can be defined and can include an address and a geocode. The training location pair can be declared as a positive pair if the address and geocode correspond to each other. The training location pair can be declared as a negative pair if the address and geocode do not correspond to each other. The training can involve inputting an address to address encoder 206 and a geocode to geocode encoder 208, where the address and a the geocode are from a training location pair. In turn, address encoder 206 outputs a first embedding vector of the address, whereas geocode encoder 208 outputs a second embedding vector of the geocode. The first and second embedding vectors are compared to update parameters (e.g., weights of nodal connections) of address encoder 206 and geocode encoder 208. The comparison can rely on a similarity function (e.g., cosine similarity, Euclidean distance similarity, etc.). The update depends on whether the address and geocode are from a positive pair or a negative pair. In case of a positive pair, the first and second embedding vectors optimally needs to match (e.g., be the same). As such, the higher the similarity between them is (e.g., where this similarity can be defined as a similarity score depending on the user similarity function), the smaller the loss function is. Conversely, in case of a negative pair, the first and second embedding vectors optimally needs to differ. As such, the higher the similarity between them is, the larger the loss function is. Parameters of address encoder 206 and geocode encoder 208 can be updated by using a back propagation algorithm that depends on the loss function.

In an example, address encoder 206 can be trained to associate an address a with a geocode g based on the various grounding factors detectable in addresses. At the same time, geocode encoder 208 can be trained to associate a given location with local vicinity specific address text characteristics. Effectively, both models can learn to align the embeddings of a location and its corresponding geolocation to maximize their similarity.

Address encoder 206 and geocode encoder 208 can embed addresses 202 and geocodes 204 to a continuous higher dimensional space that preserves proximity and hierarchical nature inherent to addresses and fuses knowledge across modalities. Address encoder 206 and geocode encoder 208 may be trained with a cross-modal objective. Address encoder 206, represented as $F_A$, may be trained to associate an address a with a geocode g based on the various grounding cues present in the address. At the same time, geocode encoder 208, represented as $F_G$, may be trained to associate a given location with local vicinity specific address text characteristics.

Address text can greatly vary with respect to a little change in geocode making it a high frequency function to learn. Therefore, in geocode encoder 208 inductive biases may control spatial smoothness and a hierarchical nature, allowing the model to interpolate to areas where no address-location pairs are present in the training data and preserve a hierarchical relationship.

Equation 1, below, formulates the Random Fourier Features (RFF) projection of a given geocode g from $R^2$ into a higher dimensional space $R^H$; H>>2 via a projection matrix $J^\sigma$ sampled from the normal distribution N (0, $\sigma^2$). The transformed geocode vector is fed to cosine and sine functions and concatenated. The value of $\sigma$ controls the sensitivity of RFF projection towards fine or coarse-grained changes in geocodes (e.g., larger the value of $\sigma$, higher the sensitivity toward input changes). It should be noted that $J^\sigma$ remains fixed throughout the training. Equal earth projection (EEP) is performed over geocodes before input to RFF module, to reduce the impact of distortions in standard geographic coordinate system.

$$RFF(g, \sigma) = [\cos(2\pi J^\sigma g), \sin(2\pi J^\sigma g)]^T \qquad \text{[Equation 1]}$$

An address text is generally influenced by multiple geographical entities of varying granularities. Therefore, it is a natural choice to have multiple RFFs (e.g. the hyperparameter Γ) with varying frequencies to obtain representations spanning from coarser to finer levels, which act as a useful inductive bias in the architecture. The frequency value of for each of the RFF module is chosen using an exponential assignment strategy. Subsequently, each of the RFF modules' projection are passed though MLPs independently. Finally, outputs from MLPs are aggregated via element-wise addition to produce the final geocode embedding. Equation 2, below, formally defines the location encoder $F_G$ for a geocode g.

$$F_G(g) = \sum_{i=1}^{\Gamma} MLP_i(RFF(g, \sigma_i)) \qquad \text{[Equation 2]}$$

Address encoder $F_A$, can utilize sentence-transformers, which can be trained using a contrastive learning objective on a very large sentence level dataset of 1B sentence pairs. The complete model weights can be fine-tuned during cross-modal alignment training.

According to some embodiments, the ML model can be trained using historical delivery data and using a self-supervised contrastive learning methodology. Historical delivery data may be aggregated to create address-geocode training pairs. Given a pair of address $a_i$ and geocode $g_i$, the model is trained with InfoNCE loss $L_{ai,gi}$ to align address and geocode embeddings as formulated in Equation 3, below.

$$-\log \frac{\exp(F_A(a_i)^T F_G(g_i)/\tau)}{\sum_{j=i}^{\mathbb{B}} \exp(F_A(a_i)^T F_G(g_j)/\tau) + \sum_{j=1}^{\mathbb{P}} \exp(F_A(a_i)^T F_G(g_j)/\tau)} \qquad \text{[Equation 3]}$$

Here, τ is a scalar temperature which controls smoothness of the softmax distribution (higher to smoother). Adding extra geocode negative examples can significantly improve the embeddings quality. Further, the described loss function can accommodate more geospatial modalities just by simply adding the corresponding paired data. The learnt embeddings may then be evaluated intrinsically and using cold start geocoding and anomalous detection tasks.

Figure 3:
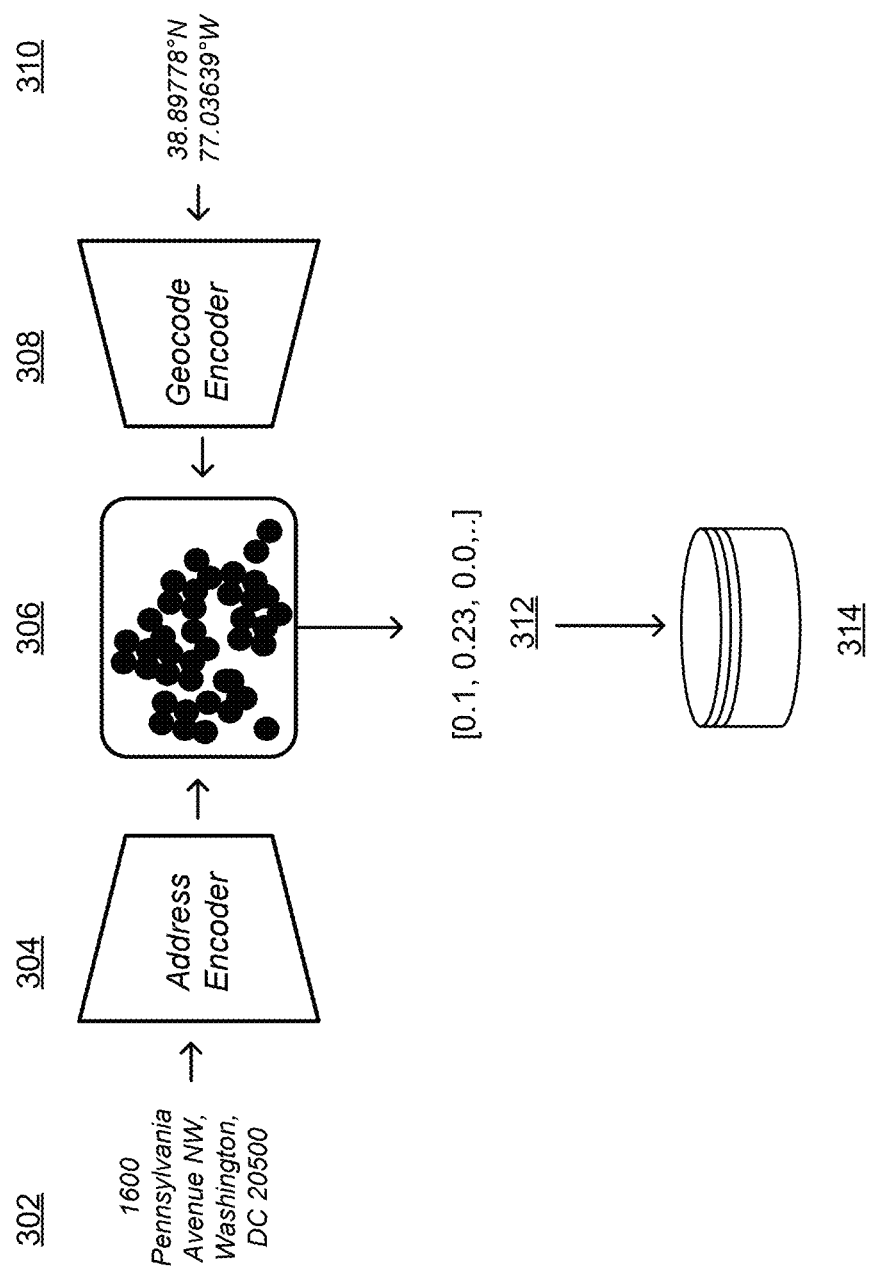
FIG. 3 illustrates an example system that generates a database based on an ML model, according to some embodiments.

FIG. 3 illustrates an example system that generates a database based on an ML model, according to some embodiments. Database 314 may include known addresses, known geocodes, embedding vectors for known addresses, and embedding vectors for known geocodes. In an example, a known address and a known geocode may be determined from historical delivery data. The known address and the known geocode can form a known pair if they correspond to each other. This can be the case when an item delivery is requested to the known address and the known geocode is collected (e.g., as GPS location of a user device of a delivery personnel) as the location of the item delivery. Additionally, the historical delivery data may include an indication of whether a delivery to an address was successful or unsuccess.

According to some embodiments, a known address 302 may be input into an address encoder 304 of the ML model (e.g., address encoder 206 after the training) which embeds known address 302 as a first embedding vector in an embedding space 306. Similarly, known geocode 310 is input into a geocode encoder 308 (e.g., geocode encoder 208 after the training) which embeds known geocode 310 as a second embedding vector into embedding space 306. Either one or both of the first and second embedding vectors define an output 112. Output 112 is stored in database 314 along with data describing known address 302 and along with known geocode 310. For this known pair, database 314 can also store an indication of a success or failure of a past delivery.

Figure 4:
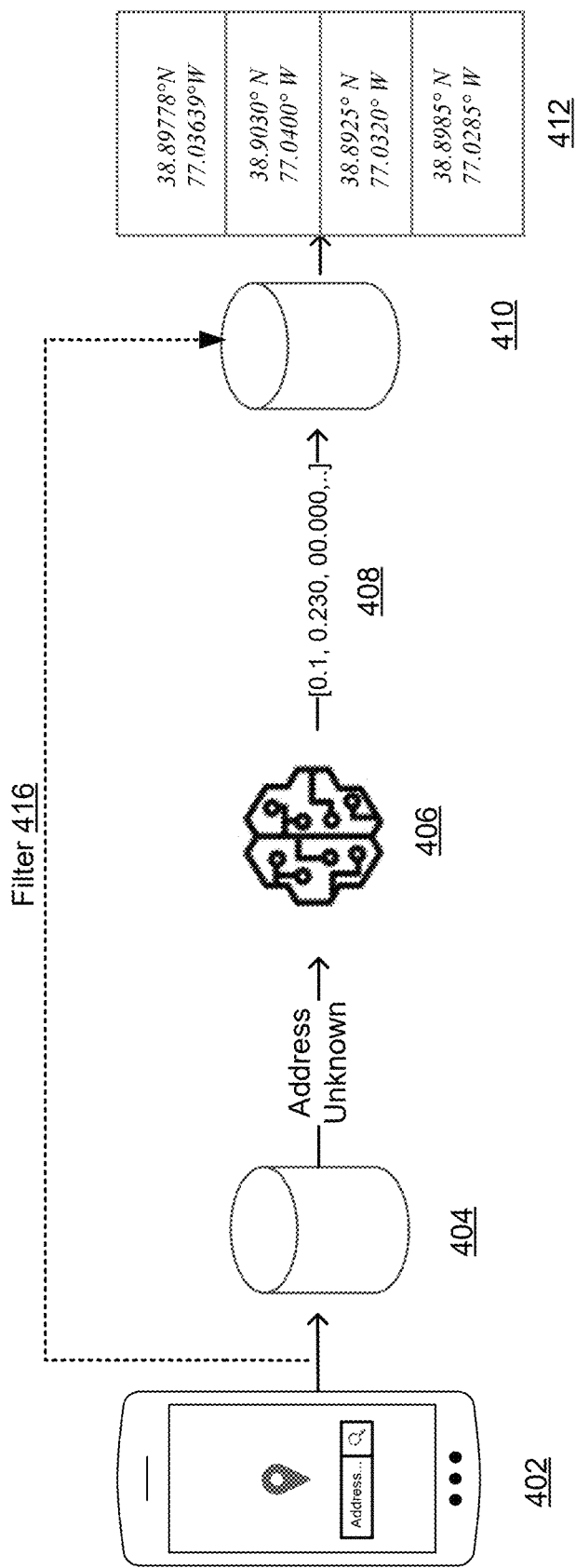
FIG. 4 illustrates an example system that involves a database and an ML model for determining a geocode for an unknown address, according to some embodiments.

FIG. 4 illustrates an example system that involves a database and an ML model for determining a geocode for an unknown address, according to some embodiments. As shown in FIG. 4, a user device 402 may be operated by a user who desires an item to be delivered to a delivery address. User input can be received by the user device 402 describing the delivery address (e.g., as a natural language input). A server (not illustrated) can receive this user input (or more specifically textual data describing the delivery address) from the user device 402. The server can query (e.g., by including the textual data in a query) a database 404 to determine whether the delivery address is stored in database 404 and whether the corresponding geocode of the delivery address is also stored (and, if stored, is associated with a successful past delivery). If the delivery address is not stored in database 404 (e.g., the query result is a null or indicates that the past delivery was unsuccessful), the server determines that the delivery address is unknown. In this case, the server generates an input to ML model 406 describing the delivery address (e.g., the input includes all or a portion of the textual data). ML model 406 may generate an embedding vector 408 which is an embedding of the delivery address. The server can receive and use the embedding vector 408 in a query to database 410, which may be the same as database 404 (or at least correspond to database 314), to query for embedding vectors that are similar to embedding vector 408. A database engine (e.g., executable program code for looking up particular fields of the database to determine a match according to a similarity function, such as a cosine function, a Euclidean distance function, and/or a clustering algorithm) can return a query result. Particularly, the database engine can determine a match between embedding vector 408 and a set of embedding vectors stored by database 410 (e.g., by determining similarities between such vectors according to the similarity function). The database engine can determine the geocodes stores by database 410 and corresponding to the matched embedding vectors. The query result can include such geocodes as a set of geocodes 412 from which the server can generate map data as described herein above in connection with FIG. 1. As discussed above, contextual data may also be embedded in the embedding space. Therefore, the corresponding matched embedding vectors may include contextual data that may be output by the ML model. In other words, when, for example, K embedding vectors are matched to the delivery address, the output of ML model 406 can include N embedding vectors of known contextual data (where N equals to or is different from K). The embedded contextual data may be, for example, satellite imagery that may be used in generating map data for presentation at user device 402.

According to some embodiments, the database engine can be pre-configured and/or the query thereto can limit the size of the geocode set to a particular size (e.g., no more than ten geocodes or that geocodes 412 have to be within a certain distance of each other or define an area of a maximum size). Additionally, or alternatively, the size of database 410 can be large. If so, to reduce the latency associated with the querying, certain features of the delivery address may be considered to reduce the size of the data to be queried. Filter 412 may be implemented to do so. For example, the delivery address can include the state of the delivery address, e.g., California. In this example, filter 416 may indicate that the query of database 410 is to be limited to embedding vectors corresponding to addresses and/or geocodes within California. As such, the computing time of the database query may be significantly reduced, and irrelevant data may be filtered out. According to some embodiments, filter 416 may be implemented by determining a location approximation of the address based on the delivery address which describes the address. The location approximation can then be compared against the known geocodes. If the location approximation and any of the known geocodes are mismatched or vary significantly, the known geocode may be removed or excluded from the candidate set of known geocodes associated with the address.

According to some embodiments, the ML model 406 may embed the entire delivery address and/or a portion of the embedding vector 408 may be used. According to some embodiments, a portion of the textual data may be input int ML model 406 which then generates embedding vector 408. In this way, matches between the delivery address and corresponding embedding vectors may be progressively determined. Therefore, the delivery address can be matched with an area such as a city, zip code, neighborhood, street, etc. Advantages of progressing encoding includes faster response time or reduced processing latency. By determining an area that the delivery address is included in, the processing time of the ML model and database query may be significantly reduced. Additionally, there may be instances where resolving the embedding of the entire delivery address may be difficult and therefore, it is beneficial to resolve the embedding at the area level (e.g., street, neighborhood, etc.). According to some embodiments, a notification may be presented at user device 402 that informs the user that the delivery address could not be resolved but that it is located somewhere within a certain area such as on a particular street.

Figure 5:
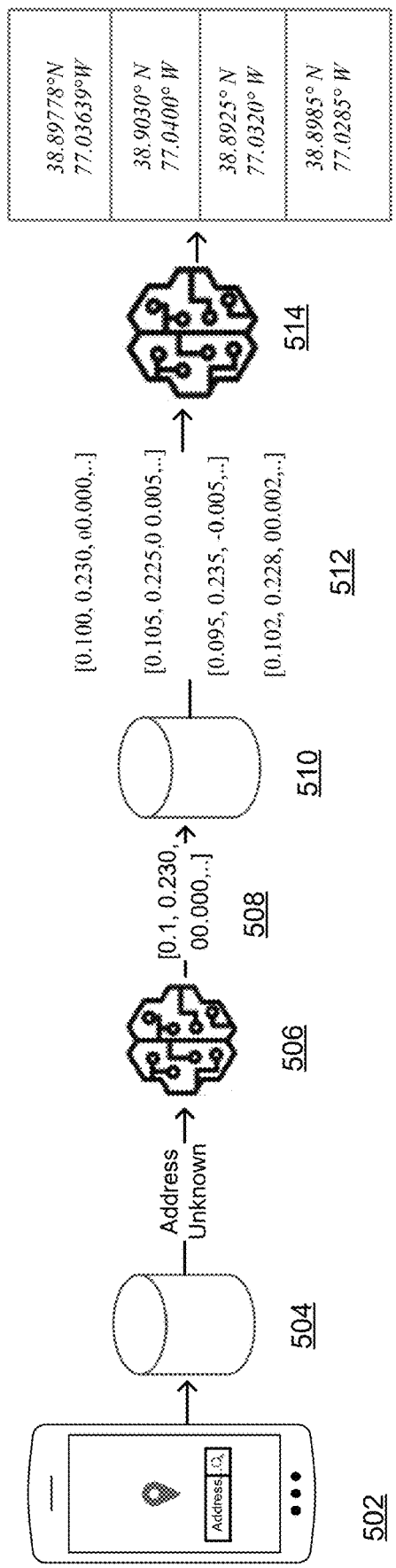
FIG. 5 illustrates another example system that involves a database and an ML model for determining a geocode for an unknown address, according to some embodiments.

FIG. 5 illustrates another example system that involves a database and an ML model for determining a geocode for an unknown address, according to some embodiments. Various operations described in this figure are similar to those of FIG. 4 and are performed by a server and/or a database engine (not shown). In the interest of brevity, the description of such operations is kept short herein but similarly and equivalently applies.

As shown in FIG. 5, a user may input a delivery address using a user device 502. The delivery address is used in a query to a database 504 to determine whether the delivery address is stored in database 504 and whether the corresponding geocode of the delivery address is known. If the delivery address is not stored in database 504, the delivery address is unknown and can be sent to an ML model 506. ML model 506 may generate embedding vector 508 which is an embedding of the delivery address. Embedding vector 508 may be used in a query to a database 510, which may be the same as database 504, to determine embedding vectors that are similar embedding vector 508. Based on the query, a set of embedding vectors 512 may be returned in a query result. The set of embedding vectors 512 may be input into ML model 514, which may be the same as ML model 506. ML model 514 may output a set of geocodes 516 that correspond to the set of embedding vectors 512. For instance, ML model 514 may include a geocode decoder that decodes the set of embedding vectors 512 to output the set of geocodes 516. Here also, ML model 514 may include an address decoder that decodes the set of embedding vectors 512 to output a set of addresses. Thereafter, map data can be generated to define an area that includes the delivery address.

Figure 6:
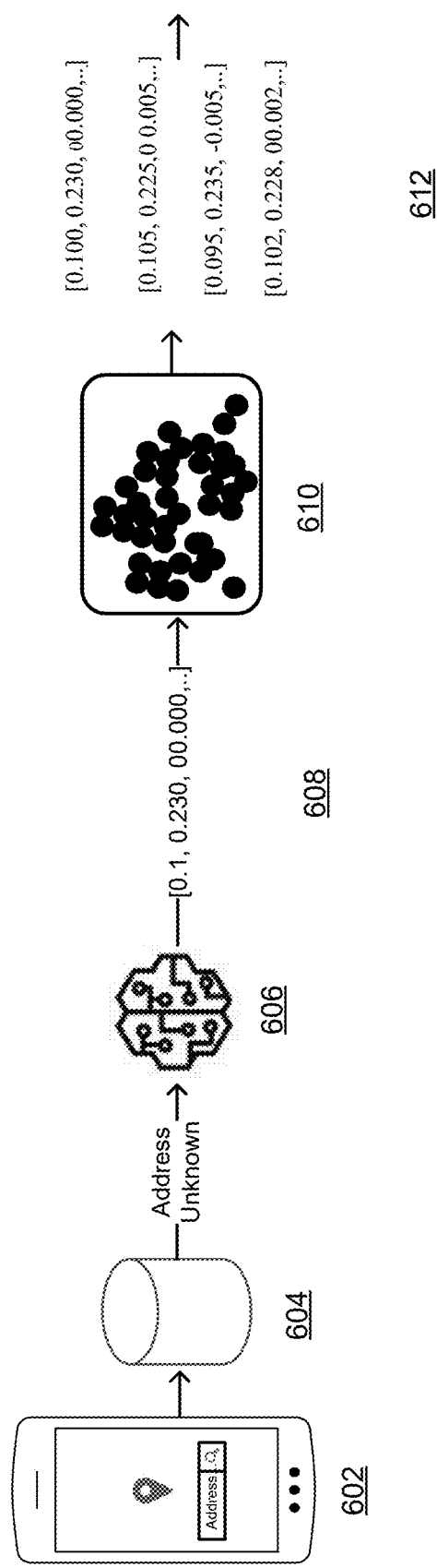
FIG. 6 illustrates yet another example system that involves a database and an ML model for determining a geocode for an unknown address, according to some embodiments.

FIG. 6 illustrates yet another example system that involves a database and an ML model for determining a geocode for an unknown address, according to some embodiments. Various operations described in this figure are similar to those of FIG. 4 and are performed by a server and/or a database engine (not shown). In the interest of brevity, the description of such operations is kept short herein but similarly and equivalently applies.

As shown in FIG. 6, a user may input a delivery address using user device 602. The delivery address is used in a query to a database 604 to determine whether the delivery address is stored in database 604 and whether the corresponding geocode of the delivery address is known. If the delivery address is not stored in database 604, the delivery address can be sent to an ML model 606. ML model 606 may generate an embedding vector 608 of the delivery address. The embedding vector can be used to look up an embedding space 610 storing embedding vectors generated from known addresses and/or known geocodes. Embedding space 610 can be predefined by previously inputting the known addresses and/or known geocodes to ML model 606. The look up results in a set of embedding vectors 612 that may be similar to embedding 608. To translate the set of embedding vectors 612 to geocodes, these vectors can be used in a query to a database (e.g., as in FIG. 4) or as input to ML model 606 (e.g., as in FIG. 5).

Figure 7:
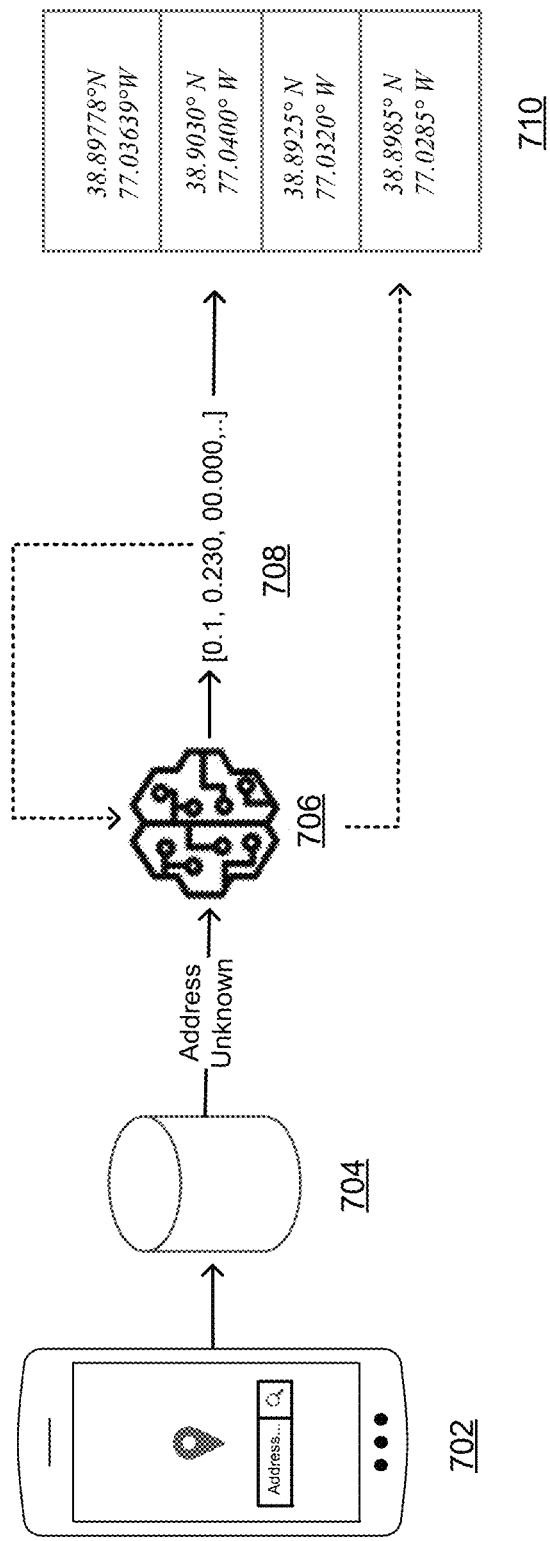
FIG. 7 illustrates a further example system that involves a database and an ML model for determining a geocode for an unknown address, according to some embodiments.

FIG. 7 illustrates a further example system that involves a database and an ML model for determining a geocode for an unknown address, according to some embodiments. Various operations described in this figure are similar to those of FIG. 4 and are performed by a server and/or a database engine (not shown). In the interest of brevity, the description of such operations is kept short herein but similarly and equivalently applies.

As shown in FIG. 7, a user may input a delivery address using user device 702. The delivery address is used in a query to a database 704 to determine whether the delivery address is stored in database 704 and whether the corresponding geocode of the delivery address is known. If the delivery address does is not stored in database 704, the delivery address can be sent to ML model 706. ML model 706 may generate geocodes 710 which may be known geocodes corresponding to known addresses that the ML model 706 has previously been trained with and has learned to embed. Here, operations of ML 706 can be thought of as including internal operations thereto. These internal operations can include generating an embedding vector 708 of the delivery address and determining nearby embedding vectors from a latent space of ML model 708 (where this latent space can be an internal representation of an embedding space that ML model 708 has learned via the training). Similar to the description of FIG. 5, ML model 708 can include a geocode decoder (and possibly an address decoder) that outputs geocodes 710 from the nearby embedding vectors (and possibly the address decoder and output corresponding nearby addresses).

Figure 8:
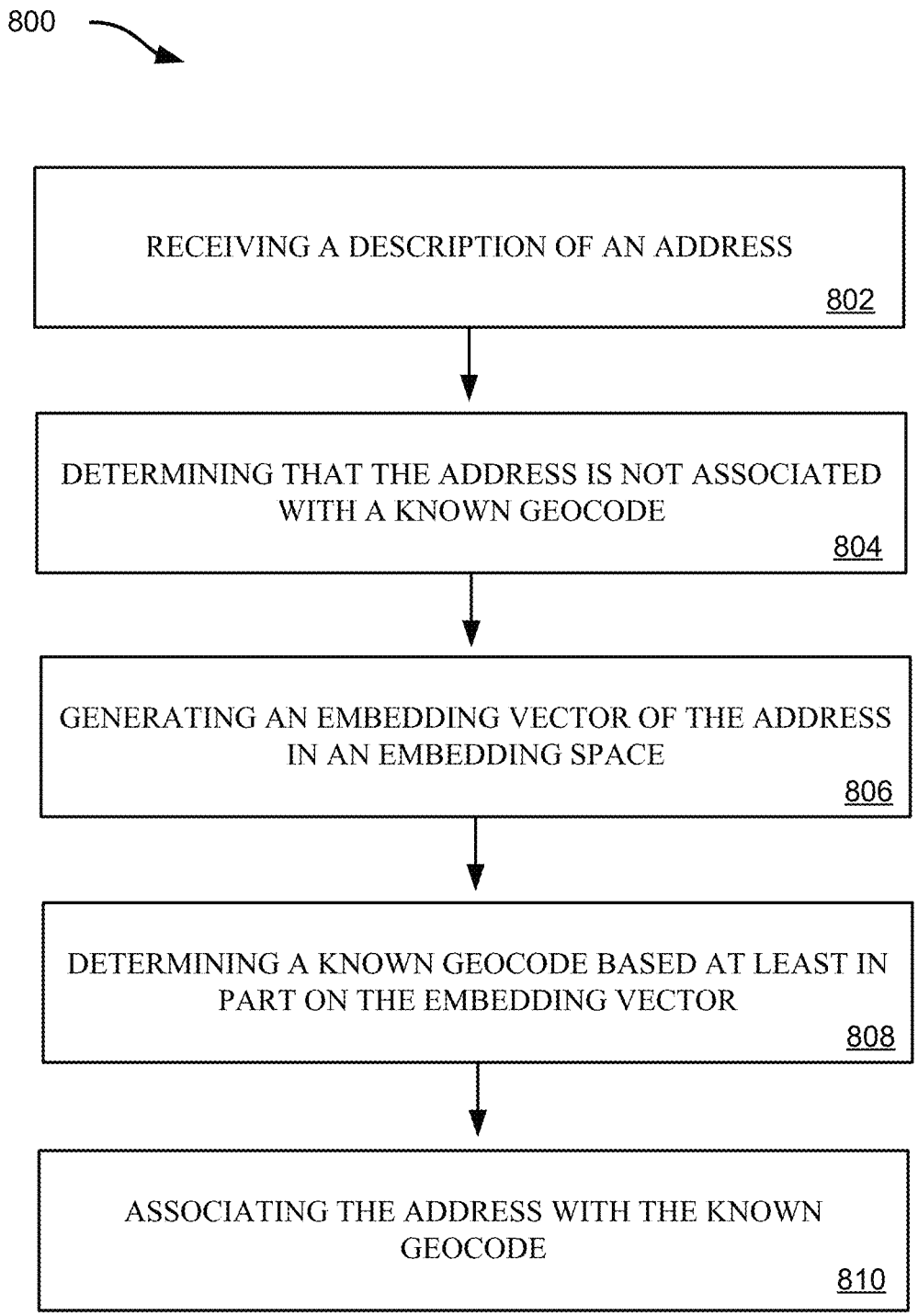
FIG. 8 illustrates a process for determining a geocode for an unknown address, according to some embodiments.

FIG. 8 illustrates a process 800 for associating an address with a known geocode, according to some embodiments. Some or all of the process 800 (or any other processes described herein, or variations, and/or combinations thereof) may be performed under the control of one or more computer system (e.g., any of the servers described herein above) configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The process 800 may include block 802, where the computer system receives a description of an address. The address may be in the form of a natural language text. This description can be received from a user device requesting a delivery to the address. At block 804 of the process 800, the computer system determines whether the address is not associated with a known geocode. In some instances, the description of the address may correspond to a previously stored address in a database of historical delivery data and may be mapped to a geocode stored in the database. In the case the address is associated with a known geocode, the corresponding geocode may be used to provide precise directions to delivery location to, for example, a delivery personnel.

However, the address text may be unstructured and/or may not correspond to prior deliveries (e.g., cold start addresses). In the case where the address is not mapped in the historical database to a geocode (and/or if a previous delivery to the address was unsuccessful), the computer system determines that the address is unknown. If so, the process proceeds to block 806.

At block 806 of the process 800, the computer system generates an embedding vector of the address in an embedding space. In some examples, the address may be input into an ML model which can generate the embedding vector. According to some embodiments, the ML model has been trained to embed addresses and geocodes in the same embedding space.

At block 808 of the process 800, the computer system determines one or more known geocodes based, at least in part on, the embedding vector of the address. This determination can use any of the techniques described herein above with reference to FIGS. 4-7.

At block 810 of the process 800, the computer system may associate the address may with the one or more known geocodes. For example, the set of known geocodes may be a set of locations that are within a defined distance from the address. Therefore, the address can be associated with the nearby locations. Using the known geocodes, map data may be generated that indicates an area encompassing the corresponding locations. According to some embodiments, the map data may be sent to and presented at a user device as a map. The map may indicate an exact or proximate location of the address by indicating that the address is within an area bounded by the one or more known geocodes.

Figure 9:
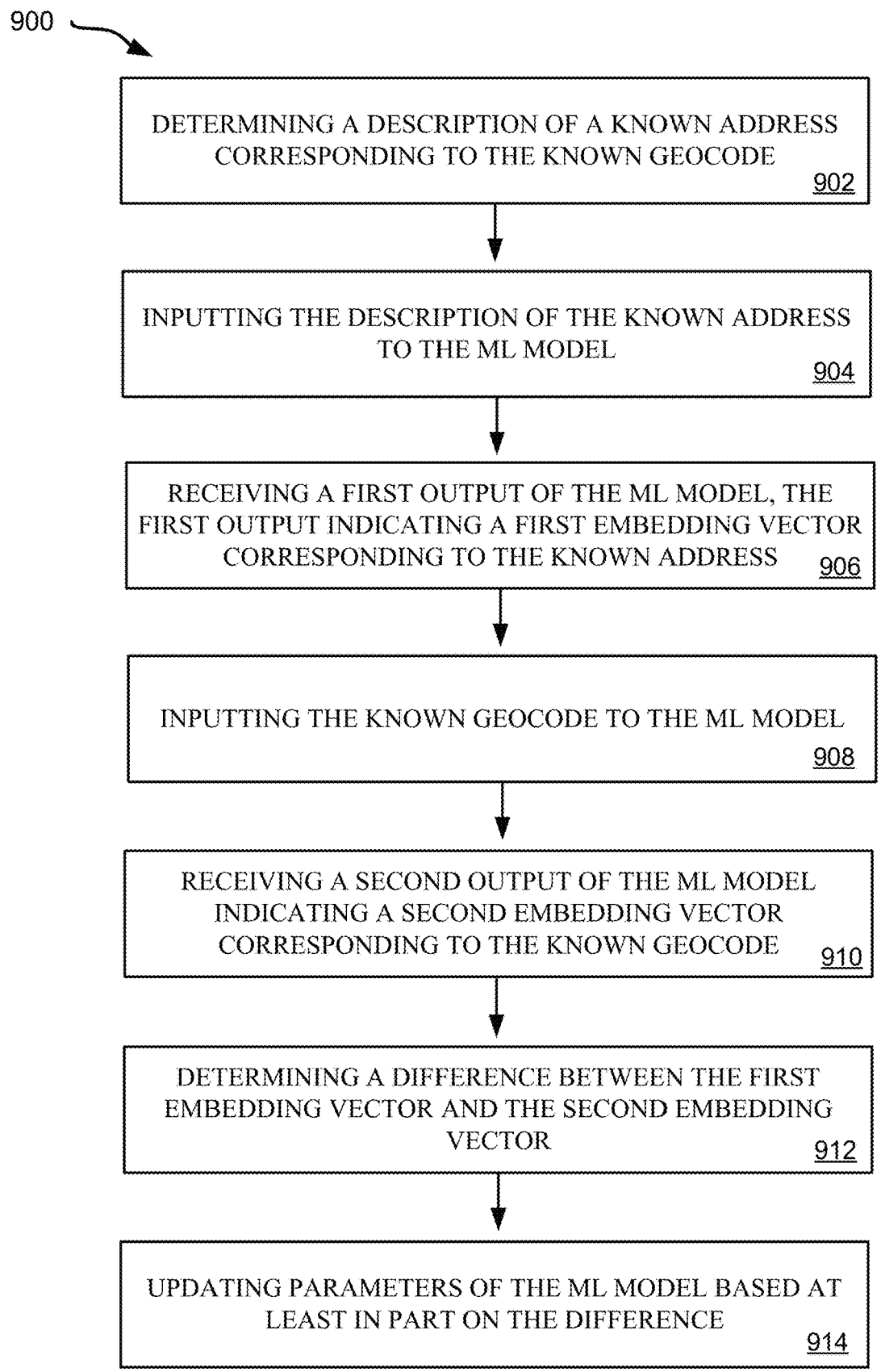
FIG. 9 illustrates a process for training a model for generating an embedding vector in an embedding space, according to some embodiments.

FIG. 9 illustrates a process 900 for training a model for generating an embedding vector in an embedding space, according to some embodiments. Some or all of the process 900 (or any other processes described herein, or variations, and/or combinations thereof) may be performed under the control of one or more computer system (e.g., any of the servers described herein above) configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

To handle the high-frequency nature of address data, the model may use Random Fourier Features to project geocodes into a higher-dimensional space. The model may be trained, for example, using the Adam optimizer with a specific learning rate and batch size. According to some embodiments, training may continue until the validation loss converges or for a set maximum of epochs.

At block 902 of the process 900, the computer system determines a description of a known address corresponding to a known geocode. The description and corresponding known geocode may be part of a training set. The training set used to train the ML model may include training data that includes historical delivery data indicating a description of a delivery address and the known geocode that corresponds to a location of a delivery device at a time of delivery at the delivery address. According to some embodiments, the training data may be updated to include a description of the address and an indication of whether the delivery to the address was successful or unsuccessful. The indication of whether the delivery was successful may be based, at least in part, on the known geocode which may be determined at the time of delivery.

At block 904 of the process 900, the computer system inputs the description of the known address to the ML model. As described above, the ML model may be trained to embed addresses and geocodes in a same embedding space. As part of the ML model, an address encoder can be trained to associate an address a with a geocode g based on the various grounding factors detectable in addresses. At the same time, a geocode encoder can be trained to associate a given location with local vicinity specific address text characteristics. Effectively, both models can learn to align the embeddings of a location and its corresponding geolocation to maximize their similarity. At this step, the ML model may use the address encoder to embed the known address in the embedding space. At block 906 of the process 900, the computer system receives a first output of the ML model. The first output indicates a first embedding vector corresponding to the known address.

At block 908 of the process 900, the computer system inputs the known geocode to the ML model. At this step, the ML model may use the geocode encoder to embed the known geocode in the embedding space. At block 910, the computer system receives a second output of the ML model. the second output indicates a second embedding vector corresponding to the known geocode.

At block 912 of the process 900, the computer system determines a difference between the first embedding vector and the second embedding vector. The difference can be determined by using a similarity function such a cosine similarity function or a Euclidean distance function.

At block 914 of the process 900, the computer system updates parameters of the ML model based at least in part on the difference. According to some embodiments, the model can be trained using a positive address-geocode pair. Based on a comparison of the embedding vector of the address and the embedding vector of the geocode generated by the model, a reward can be generated based on the similarity between the two embedding vectors. According to some embodiments, the model can be trained using a negative address-geocode pair. Based on a comparison of the embedding vector of the address and the embedding vector of the geocode generated by the model, a penalty may be generated based on the similarity between the two embedding vectors.

Figure 10:
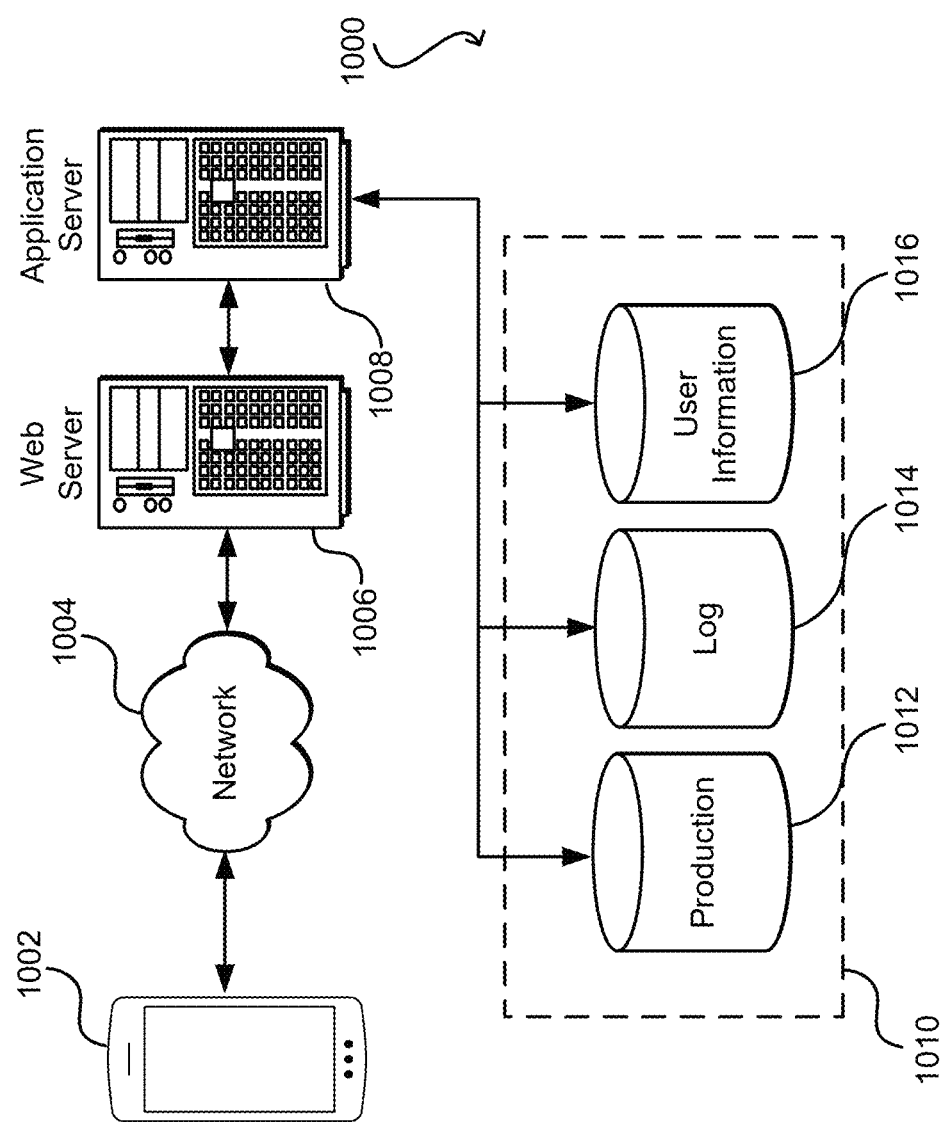
FIG. 10 illustrates an environment in which various embodiments can be implemented.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002 (e.g., the user device 102 or 112), which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 (e.g., the server 104) and a data store 1010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1002.

Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the example environment 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (e.g., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system comprising:
   one or more processors; and
   one or more memories storing a program code, wherein upon execution of the program code by the one or more processors, the system is configured to:
   receive a natural language input that describes an address;
   determine that the address is not mapped in a database to a geocode;
   generate, using a machine learning (ML) model, an embedding vector of the address in an embedding space, the ML model trained to embed addresses and geocodes in the embedding space;
   determine, by at least using the embedding vector in a query of the database, a set of known geocodes, the database storing known geocodes and embedding vectors, the embedding vectors belonging to the embedding space, generated by the ML model prior to the natural language input being received, and corresponding to at least one of the known geocodes or known addresses;
   generate map data indicating an area encompassing the set of known geocodes; and cause the map data to be presented on a user interface, the presentation indicating that the address is within the area.

2. The system of claim 1, wherein the ML model comprises:
   a geocode encoder trained to embed the geocode in the embedding space; and
   an address encoder trained to embed the address in the embedding space.

3. The system of claim 2, wherein the execution of the program code further configures the system to:
   receive the known geocodes and information indicating the known addresses that correspond to the known geocodes;
   embed, using the geocode encoder, the known geocodes in the embedding space; and
   embed, using the address encoder, the known addresses in the embedding space.

4. The system of claim 1, wherein determining the set of known geocodes comprises:
   receiving a set of embedding vectors as a result of the query;
   inputting the set of embedding vectors to the ML model; and
   receiving an output of the ML model, the output indicating the set of known geocodes.

5. A method comprising:
   receiving a description of natural language input that describes an address;
   determining that the address is not associated with a known mapped in a database to a geocode;
   generating, using a first machine learning (ML) model, an embedding vector of the address in an embedding space, the ML model trained to embed addresses and geocodes in the embedding space;
   determining a known geocode based at least in part on the embedding vector, by at least using the embedding vector in a query of the database, a set of known geocodes, the database storing known geocodes and embedding vectors, the embedding vectors belonging to the embedding space, generated by the ML model prior to the natural language input being received, and corresponding to at least one of the known geocodes or known addresses;
generating map data indicating an area encompassing the set of known geocodes; and
associating the address with the known geocode causing the map data to be presented on a user interface, the presentation indicating that the address is within the area.

6. The method of claim 5, wherein the embedding vector is a first embedding vector, and further comprising:
determining a match between the first embedding vector and a second embedding vector, the second embedding vector corresponding to an area; and
associating the address with the area.

7. The method of claim 5, further comprising:
determining a match between the embedding vector and a plurality of embedding vectors;
determining that the plurality of embedding vectors is associated with an area; and
associating the address with the area.

8. The method of claim 5, wherein the ML model is a multimodal ML model configured to embed contextual data in the embedding space, wherein the embedding vector is a first embedding vector, and wherein the method further comprises:
determining a second embedding vector based at least in part on the first embedding vector, wherein the second embedding vector corresponds to the contextual data; and
associating the address with the contextual data.

9. The method of claim 5, further comprising:
querying, based at least in part on the embedding vector, a database that stores known geocodes and corresponding embedding vectors; and
receiving a query result based at least in part on the embedding vector being matched with a set of embedding vectors, the query result including a set of geocodes corresponding to the set of embedding vectors.

10. The method of claim 5, wherein the known geocode is determined based at least in part on a match between the embedding vector and another embedding vector that belongs to the embedding space and that corresponds to the known geocode or a known address corresponding to the known geocode.

11. The method of claim 5, wherein the ML model is trained by:
determining a description of a known address corresponding to the known geocode;
inputting the description of the known address to the ML model;
receiving a first output of the ML model, the first output indicating a first embedding vector corresponding to the known address;
inputting the known geocode to the ML model;
receiving a second output of the ML model, the first output indicating a second embedding vector corresponding to the known geocode;
determining a difference between the first embedding vector and the second embedding vector; and
updating parameters of the ML model based at least in part on the difference.

12. The method of claim 5, wherein the ML model is trained by:
determining a first known address that corresponds to the known geocode;
generating, by using the ML model, a first embedding vector corresponding to the first known address and a second embedding vector corresponding to the known geocode; and
generating a reward based at least in part on a similarity between the first embedding vector and the second embedding vector.

13. The method of claim 5, wherein the ML model is further trained by:
determining a second known address that does not correspond to the known geocode;
generating, by using the ML model, a third embedding vector corresponding to the second known address; and
generating a penalty based at least in part on a similarity between the third embedding vector and the second embedding vector.

14. The method of claim 5, further comprising:
determining a location approximation of the address based at least in part on the description natural language input;
determining, based at least in part on the embedding vector, a second known geocode;
determining a mismatch between the second known geocode and the location approximation; and
removing or excluding the second known geocode from a set of known geocodes associated with the address.

15. One or more non-transitory computer-readable media storing program code that, upon execution by one or more processors, cause operations including:
receiving a description of natural language input that describes an address;
determining that the address is not associated with a known mapped in a database to a geocode;
generating, using a first machine learning (ML) model, an embedding vector of the address in an embedding space, the ML model trained to embed addresses and geocodes in the embedding space;
determining a known geocode based at least in part on the embedding vector, by at least using the embedding vector in a query of the database, a set of known geocodes, the database storing known geocodes and embedding vectors, the embedding vectors belonging to the embedding space, generated by the ML model prior to the natural language input being received, and corresponding to at least one of the known geocodes or known addresses;
generating map data indicating an area encompassing the set of known geocodes; and
associating the address with the known geocode causing the map data to be presented on a user interface, the presentation indicating that the address is within the area.

16. The one or more non-transitory computer-readable media of claim 15, wherein the known geocode is based at least in part on a match between a portion of embedding vector and a portion of another embedding vector corresponding to an area.

17. The one or more non-transitory computer-readable media of claim 15, wherein the embedding vector of the address corresponds to an entirety of the address, and wherein a portion of the embedding vector is matched to a portion of another embedding vector corresponding to a known address.

18. The one or more non-transitory computer-readable media of claim 15, wherein the operations further include:

generating, based at least in part on the description natural language input of the address, an input to the ML model; and receiving an output of the ML model corresponding to the input, the output including the known geocode.

19. The one or more non-transitory computer-readable media of claim 15, wherein the operations further include:
- generating, based at least in part on the description natural language input of the address, a first input to the ML model;
- receiving a first output of the ML model corresponding to the first input, the first output including the embedding vector;
- generating, based at least in part on the embedding vector, a second input to the ML model or another ML model; and
- receiving a second first output of the ML model or the other ML model corresponding to the second input, the second output including the known geocode.

20. The one or more non-transitory computer-readable media of claim 15, wherein the ML model is trained using training data that includes historical delivery data indicating (i) a description of a delivery address and (ii) the known geocode that corresponds to a location of a delivery device at a time of a delivery at the delivery address, and wherein the training data is updated to include the description of the address and an indication of whether a delivery to the address, based at least in part on the known geocode, was successful or unsuccessful.

* * * * *